United States Patent [19]

Spinelli et al.

[11] Patent Number: 4,746,714
[45] Date of Patent: May 24, 1988

[54] STABILIZED ACRYLIC RESIN

[75] Inventors: Harry J. Spinelli; Christopher Scopazzi, both of Wilmington, Del.; Joseph A. Antonelli, Riverton, N.J.

[73] Assignee: E. I. Du Pont de Nemours and Company, Wilmington, Del.

[21] Appl. No.: 875,059

[22] Filed: Jun. 17, 1986

[51] Int. Cl.[4] .................... C08L 51/00; C08L 33/08; C08L 33/10
[52] U.S. Cl. .................................. 525/286; 525/288; 525/293; 525/301; 525/308; 525/309; 524/504; 524/521; 524/923
[58] Field of Search .............. 525/286, 923, 309, 293, 525/301, 308, 288; 524/504, 521

[56] References Cited

U.S. PATENT DOCUMENTS

| | | | |
|---|---|---|---|
| 4,493,914 | 1/1985 | Chatha | 524/923 |
| 4,508,880 | 4/1985 | Webster | 526/194 |
| 4,528,317 | 7/1985 | Theodore et al. | 524/923 |
| 4,530,959 | 7/1985 | Theodore et al. | 524/923 |
| 4,533,695 | 8/1985 | Theodore et al. | 524/923 |
| 4,605,720 | 8/1986 | Chatha et al. | 524/923 |

Primary Examiner—Allan M. Lieberman
Attorney, Agent, or Firm—Donald W. Huntley

[57] ABSTRACT

Stabilized acrylic resin having a core of acrylic polymer and a substantially linear stabilizer having one polymerizable functional group at one end of the stabilizer molecule, the resins being useful as rheology control agents for coating compositions.

9 Claims, No Drawings

STABILIZED ACRYLIC RESIN

BACKGROUND OF THE INVENTION

Non-aqueous dispersions have previously been found to be useful as rheology control and toughening agents in coating applications. Known non-aqueous dispersions typically comprise a core of material that is not soluble in the solvent system, and, attached to the core, a stabilizing component which is soluble in the solvent system used. In the reactive system, the stabilizer may act as a compatibilizer. The quantity of stabilizer attached to the core is adjusted to solubize the entire structure in the coating composition.

In the past, non-aqueous dispersions have been prepared using stabilizers having polymerizable functional groups randomly distributed along the chain of the stabilizer. With the random distribution of the polymerizable functional groups along the chain, the effectiveness of the non-aqueous dispersion was less than optimal, and effort has been directed toward the development of non-aqueous dispersions that would provide equivalent or superior performance with a more compact molecule.

The use of chain transfer agents for the preparation of stabilizing components used in non-aqueous dispersions can result in functional groups at the end of the stabilizer molecule, but typically in only 40 to 70 percent of the resulting products. Consequently, substantial quantities of non-polymerizeable linear polymers are present in the final, stabilized resin prepared from such stabilizers. The presence of such polymers has an undesirable plasticizing effect, and would depreciate the resistance of coatings prepared from such resins to solvents such as gasoline.

Still other previous attempts at preparing stabilized acrylic resin have included the preparation of multifunctional or multi-segmented stabilizers, each of which is less than completely satisfactory from the standpoint of product performance or uniformity.

SUMMARY OF THE INVENTION

The instant invention provides a stabilized acrylic resin which, through the regularity of the molecular structure, is more effective than similar non-aqueous dispersions previously available.

Specifically, the instant invention provides a stabilized acrylic resin having (1) a core of acrylic polymer which is non-soluble in organic solvent and, grafted thereto, (2) a plurality of substantially linear stabilizer components, each of which is soluble in organic solvent and has one end of the stabilizer molecule grafted to the core, the stabilized acrylic resin being substantially free from non-polymerizable linear polymer.

The instant invention further provides a process for the preparation of a stabilized acrylic resin comprising bringing into contact an unsaturated monomer with a catalyst system in the presence of an initiator containing silicon, tin or germanium and which has a first functional group as part of the structure to give a polymer chain having the first functional group at one end; and bringing the resulting polymer chain into contact, under reaction conditions, with a molecule having a second functional group which is reactive with the first functional group and which can be polymerized with other polymerizable monomers to provide a stabilizing component, and bringing the resulting stabilizing component into contact, under reaction conditions, with unsaturated monomer to produce the stabilized acrylic resin.

DETAILED DESCRIPTION OF THE INVENTION

The present invention is based on the discovery of the beneficial use of a substantially linear stabilizer molecule having a polymerizable functional group at only one end of the molecule. The use of these molecules in the prepartion of stabilized acrylic resins results in the attachment of the stabilizing molecules onto the core of insoluble acrylic polymer only at one end, as opposed to both ends or one or more places in the middle of the stabilizing molecule.

The stabilizing molecules used in the present invention can be made using Group Transfer Polymerization (GTP), substantially as described in Webster U.S. Pat. No. 4,508,880, hereby incorporated by reference. In accordance with that process, an unsaturated monomer is contacted with an initiator and a catalyst system containing silicon, tin or germanium, under which the polymerization proceeds in a controlled manner, as opposed the random manner typical of polymerization reactions, so that a substantially linear polymer can be prepared having a polymerizable functional group at only one end of the polymer chain and on every polymer chain.

In the preparation of stabilizers used in the present invention, a monomer is brought into contact with a catalyst and an initiator that has a first functional group as part of its structure. While a wide variety of functional groups can be used, the first functional group is preferably selected from blocked hydroxy, epoxy, blocked acid and aziridine.

Monomers which can be used in the present invention include those described in the aforementioned U.S. Pat. No. 4,508,880 at column 8, lines 4 to 22, with the exception of 3-methacryloxypropyl acrylate; and 2-methacryloxyethyl acrylate and linalate.

Catalysts which can be used include those disclosed in U.S. Pat. No. 4,508,880 at column 11, lines 42 to 68, as well as those described in the copending, coassigned patent application of Dicker et al., U.S. patent application Ser. No. 707,190 filed Mar. 1, 1985, hereby incorporated by reference.

Initiators which can be used include, for example, 1-(2-trimethyl-siloxyethoxy)-1-trimethylsiloxy-2-methylpropene and 1-(2-[1-ethoxyethoxy]-ethoxy-1-trimethylsiloxy-2-methylpropene. Because of the nature of GTP, the blocked hydroxyl group is left at the beginning of the polymer chain. Thus every chain has one functional group attached to one end. When the polymerization is completed, the blocking group is removed from the end of the polymer chain. This gives a hydroxyl terminated polymer.

The functional group is then reacted with compounds that can attach a polymerizable double bond to the polymer. Such compounds include, for example, any molecule that has a second functional group that can react with the first functional group as well as a group that can be polymerized with other polymerizable monomers. Second functional groups that can be reacted with the first functional groups include epoxy, hydroxy, acid and aziridine, as well as isocyanate, acid chloride, anhydride and ester. Illustrative compounds contain a second functional group, for example, 2-isocyanatoethyl methacrylate, methacryloyl chloride, acryloyl chloride, acrylic acid, methacrylic acid, anhydrides of acrylic and methacrylic acid, maleic anhydride, itaconic anhydride, glycidyl methacrylate, and esters of acrylic and methacrylic acid in transesterification reactions.

In the prepartion of a linear stabilizer using a blocked acid initiator, compounds such as 1,1-bis(trimethylsiloxy)-2-methylpropene can be used as the initiator having the first functional group. After removing the blocking group, the acid terminated polymer is reacted with monomers that contain functional groups that can react with acids. Such monomers include glycidyl acrylate and methacrylate, aziridinyl acrylate and methacrylate, and the hydroxy esters of acrylic and methacrylic acid. Hydroxy esters which can be used include hydroxyethyl acrylate and methacrylate, hydroxypropyl acrylate and methacrylate, and hydroxybutyl acrylate and methacrylate.

In still another method for preparing the stabilizer, initiators that contain a glycidyl or aziridinyl group (e.g., 1-(2,3-epoxypropoxy)-1-trimethylsiloxy -2-methylpropene and 1-aziridinoxy-1-trimethylsiloxy -2-methylpropene) can be used to make the initial polymer. These groups can then be reacted with acrylic or methacrylic acid, to put a double bond at one end of the macromonomer. In addition, monomers can be polymerized with a blocked diol initiator, e.g., 5-(1-trimethylsiloxy-2-methyl-1-propenoxy methyl)-2,2-dimethyl-1,3-dioxolane. After polymerizing the appropriate monomers and deblocking the diol, a polymer chain would be formed that has two hydroxyls attached to one end. These hydroxyls can then be post reacted with compounds previously listed that react with hydroxyls and have a polymerizable group. An example is isocyanatoethyl methacrylate. These will generate a macromonomer with two double bonds at one end. The advantage of having two groups at one end is that there should be a higher probability of incorporating the macromonomer in the second polymerization step.

The linear stabilizers so prepared typically have a number average molecular weight of less than 25,000. The size or molecular weight of these polymeric materials can vary, but preferably are substantially uniform in molecular weight. The stabilizing component of the present compositions preferably has a dispersity, measured as the weight average molecular weight divided by the number average molecular weight, of about from 1.0 to 2.5.

In the preparation of the stabilized acrylic resins of the present invention, the stabilizing component, prepared as described above, is incorporated into an acrylic polymer. The stabilizer is preferably incorporated into the polymer by polymerizing the polymerizable functional group at the one end of the stabilizer molecule with monomers. Monomers which can be used to prepare the acrylic core include, for example, alkyl methacrylates and acrylates that can be used to prepare the acrylic polymers are: methyl methacrylate, ethyl methacrylate, butyl methacrylate, hexyl methacrylate, 2-ethylhexyl methacrylate, nonyl methacrylate, lauryl methacrylate, stearyl methacrylate, cyclohexyl methacrylate, isodecyl methacrylate, propyl methacryalte, phenyl methacrylate, isobornyl methacrylate, ethyl acrylate, propyl acrylate, isopropyl acrylate, butyl acrylate, isobutyl acrylate, hexyl acrylate, 2-ethylhexyl acrylate, nonyl acrylate, lauryl acrylate, stearyl acrylate, cyclohexyl acrylate, isodecyl acrylate, phenyl acrylate, isobornyl acrylate, and the like.

Adhesion promoting monomers can also be used in the acrylic polymers such as diethyl aminoethyl methacrylate, tertiary butyl aminoethyl methacrylate, 3,(2-methacryloxy ethyl)-2,2-spiro cyclohexyl oxazolidene and the like.

The acrylic core can be polymerized using conventional, free radical polymerization techniques or group transfer polymerization techniques as described in the aforementioned Webster patent.

The core can also be prepared from monomers having various functional groups such as hydroxy, acid, epoxy, isocyanate, and unsaturated air-drying moieties.

Typical hydroxy alkyl acrylates and methacrylates which can be used to prepare the acrylic polymers are: 2-hydroxy ethyl acrylate, 2-hydroxy propyl acrylate, 2-hydroxy butyl acrylate, 2-hydroxy ethyl methacrylate, 2-hydroxy propyl methacrylate, 2-hydroxy butyl methacrylate and the like.

Other functional monomers which can be incorporated into the acrylic core include glycidyl methacrylate, glycidyl acrylate, isocyanoethyl methacrylate, methacrylic acid, acrylic acid, itaconic acid, itaconic anhydride, and maleic anhydride. These functional monomers can result in acrylic cores that are crosslinked or non-crosslinked.

The acrylic polymers can contain about 0.1 to 30% by weight of other constituents such as acrylonitrile, metharcylonitrile, acrylamide and methacrylamide, styrene or substituted styrene such as methyl styrene.

Solvents generally used in the polymerization of the acrylic polymer with the stabilizer include any that would give emulsions or dispersions of the stabilized resin. In the alternative, solvents can be used which are solvents for the entire polymer formed so that the final polymer structure is soluble.

The resulting stabilized resin formed has a core which is insoluble in the solvents used, having attached thereto the stabilizer which is copolymerized with the core material through the polymerizable functional group at one end of each molecule. The copolymerized stabilizing component is soluble in the solvent and thus acts to stabilize the entire article. Solubility is used in its usual sense, indicating that a molecule of the individual component of the resin would remain as a separate phase in a solvent such as xylene at room temperature if insoluble, and would not form a separate phase if soluble.

The stabilized acrylic resins of the present invention provide, in a coating composition using this material as a rheology control agent, better outdoor durability than resins made with styrene or butadiene monomers. The resins exhibit a uniformity which results in reproducible particle size and rheology control.

In addition to the terminal polymerizable functional groups on the linear stabilizers used in the present invention, the stabilizers can contain other, non-polymerizable functional groups such as epoxy, amines, blocked hydroxyl acids and amides. Such non-polymerizable functional groups can further enhance the performance of coatings prepared from these polymers by providing crosslinking sites.

The unique physical characteristics of the stabilized acrylic resins of the present invention, and particularly the attachment of a stabilizing resin at only one end of the polymer can be confirmed by differential scanning calorimetry, nuclear magnetic resonance, gas chromatography and infrared analysis. The stabilized resins of the present invention are substantially free from non-polymerizable linear polymer, that is, linear stabilizer having no double bond in its structure that is capable of further polymerization. This is a function of the linear stabilizer components each having a functional group at one end of the stabilizer molecule. Accordingly, the concentration of non-polymerizable linear polymer is typically substantially less than 1 percent. In addition, the stabilized acrylic resins of the present invention exhibit a substantially lower concentration of ungrafted material than stabilized acrylic resins prepared, for example, using chain transfer techniques. In the use of chain transfer preparation techniques, the stabilizing resin often contains a polymerizable double bond, but the double bond is not attached to the end of the chain, which accordingly results in at least about 20 percent of ungrafted material in the final stabilized resin. The percentage of ungrafted polymer in the present invention is typically less than about 10 percent and often less than about 5 percent by weight The substantial absence of non-polymerizable linear polymer is believed to be a function of the method of preparation of the present resins.

The stabilized acrylic resins of the present invention can be used as rheology control and toughening agents in conventional coating applications. Typically, the resins will be present in a concentration of about from 1 to 80 percent by weight, and preferably about from 10 to 40 percent by weight, of the total coating composition.

The resins can be used effectively in a wide variety of coating compositions, including unicoats, basecoats and clear coatings. When used in clear coatings, the resins provide exceptionally good rheology control. The resins can also be used in molding resins and acrylate sheeting, providing rheology control in the course of preparation of such shaped articles and enhanced toughness in the finished product.

The present invention is further illustrated by the following specific examples, in which parts and percentages are by weight unless otherwise indicated.

EXAMPLE 1

A macromonomer was prepared that has a P-NBMA composition and a methacrylate double bond at one end. The macromonomer is made using a blocked hydroxyl initiator, followed by polymerization of NBMA, removal of the blocking group, and finally reacting the hydroxyl with disocyanatoethyl methacrylate.

A 5 liter flask equipped with a thermometer, reflux condenser, N2 inlet, mechanical stirrer and addition funnels was charged with 981.5 gm of toluene, 98.59 gm of 1-(2-trimethylsiloxyethoxy)-1-trimethylsiloxy-2-methyl propene, 0.357 M, and 2.42 ml of a 1.0 M solution of tetraburylammonium m-chlorobenzoate dissolved in acetonitrile. Feed I, 1796.3 gm of n-butyl methacrylate (NBMA), was added over 64 minutes. Feed II, 2 ml of 1.0 M tetrabutylammonium m-chlorobenzoate and 2.51 gm of glyme, was begun simultaneously with Feed I. Feed II was added over 72 minutes. At 100 minutes, 100 gm of methanol was added to quench the reaction. The polymer formed was at 62.2% solids (100% conversion), and had Mn=5640, Mw=6510, D=1.15, and Theo. Mn=5030. To the polymer solution was added 25.4 gm of water and 266.05 gm of isopropanol. The polymer solution was then refluxed for 5 hours. The IR spectrum of some dried polymer showed a band at 3550 cm $(-1)$, indicating the presence of hydroxyls. Toluene, 300 ml., was then added and the polymer solution was distilled until the vapor temperature reached 105 degrees C. to remove all excess water and alcohols. An IR spectrum showed the band at 3550 cm $(-1)$ still present. To the polymer solution was added 10.99 gm of a 1% solution of dibutyltin dilaurate in methyl ethyl ketone and 110.7 gm of 2-isocyanoethyl methacrylate (IEM), 0.71 M. An IR spectrum showed an OH band at 3550 cm $(-1)$ and an isocyanate (NCO) band at 2265 cm $(-1)$. The polymer solution was heated at 60 degrees C. for 2 hours. An IR spectrum then showed no OH band at 3550 cm $(-1)$ but a smaller NCO ban at 2265 cm $(-1)$, confirming that all hydroxyls on the polymer had been reacted with the IEM, thus placing one polymerizable group on every polymer chain. Methanol, 50 ml, was then added to the polymer solution and the solution was heated to 60 degrees C. for 2 hours. An IR spectrum showed no NCO band at 2265 cm $(-1)$, a small OH band (from the methanol) at 3550 cm $(-1)$, and a carbon-carbon double bond (from the methacrylate functionality at 1640 cm $(-1)$ confirming that any excess IEM has been quenched.

A non-aqueous dispersion (NAD) was prepared using the NBMA macromonomer as the stabilizing resin. The NAD was prepared by copolymerizing the NBMA macromonomer with other monomers in a free radical process.

A 1 liter flask equipped with heating mantle, reflux condenser, and addition funnels was charged with 125.02 gm of NBMA macromonomer solution prepared above, 91.32 gm of xylene, 12.32 gm of i-propanol, 221.08 gm of heptane, and 17.56 gm of aliphatic hydrocarbon (bp 155–190). The flask was heated to reflux and 0.32 gm of t-butyl peroctoate was added. Feed I was then begun. Feed I consisted of 8.63 gm of 30 methacrylic acid, 53.94 gm of hydroxyethyl acrylate, 100.32 gm of methyl methacrylate, 38.84 gm of methyl acrylate, 10.79 gm of stryene, 3.29 gm of glycidyl methacrylate, 62.77 gm of NBMA macromonomer solution prepared above, 8.16 gm of xylene, 43.84 gm of 35 aliphatic hydrocarbon (bp 155–190), 8.75 gm of i-butanol, and 3.24 gm of t-butyl peroctoate. Feed I was added over 3.5 hours. Reflux was maintained throughout. Feed II was begun following a 45 minute hold period after Feed I was completed. Feed II was added over an additional 1.5 hours. Feed II consisted of 11.57 gm of i-butanol and 2.12 gm of t-butyl peroctoate. The flask was held at reflux for 1 hour following the completion of Feed II. The resulting polymer had a composition of NBMA/MMA/MA/HEA/STY/GMA/MAA 35.1/30.2/11.7/16.2/3.2/1.0/2.6.

A coating composition was made from a NAD prepared as described above that is stabilized by a NBMA macromonomer. The NAD provided rheology control and prevented the coating from sagging once it was applied. In addition, flake disorientation in the coating composition was reduced.

A silver metallic coating was made by blending:

| | Total | Solid |
|---|---|---|
| Acrylic polymer (a standard linear acrylic polymer that uses MMA, HEA, NBA, and styrene monomers. It is 68% solids.) | 66.18 | 45.0 |
| Resimene 755 (melamine crosslinker) | 35.0 | 35.0 |
| Aluminum paste | 23.44 | 15.0 |

|  | Total | Solid |
|---|---|---|
| Methyl ethyl ketone | 41.6 | |
| Propylene glycol monomethyl ether acetate | 39.0 | |
| Dodecylbenzenesulfonic acid | 0.80 | |
| NAD | 48.90 | 20.0 |

This coating was 45.1% solids and had a pigment-to-binder ratio (P/B) of 15/100 with aluminum flake as the only pigment. It contained 20 parts of NAD rheology control agent prepared using the NBMA macromonomer. The coating was applied as a basecoat at a thickness of 0.8 mils on primed steel and aluminum panels. The basecoat was covered with a clear coat that consisted of a standard acrylic resin, melamine crosslinker, and rheology control agents. Panels were baked for 30 minutes at 250 degrees F. The films were hard, gloss coatings that could be used in applications such as automotive or appliance finishes. Basecoats that did not use the NAD made from the NBMA macromonomer had poor appearances.

EXAMPLE 2

A macromonomer was prepared that had a P-EHMA composition and a methacrylate double bond at one end. The macromonomer was made using a blocked hydroxyl initiator, polymerization of EHMA, removal of the blocking group, and finally reacting the hydroxyl with isocyanatoethyl methacrylate.

A 5 liter flask equipped with thermometer, reflux condenser, N2 inlet, mechanical stirrer, and addition funnels was charged with 895.2 gm of toluene, 49.45 gm of 1-(2-trimethylsiloxyethoxy)-1-trimethylsiloxy-2-methyl propene, 0.179 M, and 3.12 ml of a 1.0 M solution of tetrabutylammonium m-chlorobenzoate dissolved in acetonitrile. Feed I, 1796.8 gm of 2-ethylhexyl methacrylate, was added over 35 minutes. Feed II, 4.5 ml of 1.0 M tetrabutylammonium m-chlorobenzoate and 14.9 gm of glyme, was begun simultaneously with Feed I. Feed II was added over 60 minutes. At 102 minutes, 20 gm of methanol was added to quench the reaction. The polymer formed was at 61.7% solids (99.0% conversion), and had Mn=10,700, Mw=13,100, D=1.22, and Theo. Mn=10,000. To the polymer solution was added 34.0 gm of water and 102.17 gm of isopropanol. The polymer solution was then refluxed for 5 hours. The IR spectrum of some dried polymer showed a band at 3550 cm (−1) that corresponds to an OH band. Toluene, 300 ml, was then added and the polymer solution was distilled until the vapor temperature reached 105 degrees C. A total of 484.0 gm of material was distilled off. This removed all excess water and alcohols. An IR spectrum showed the band at 3550 cm (−1) still present. To the polymer solution was added 27.7 gm of a 1% solution of dibutyltin dilaurate in methyl ethyl ketone and 55.54 gm of 2-isocyanoethyl methacrylate, 0.36 M. An IR spectrum showed an OH band at 3550 cm (−1) and an isocyanate (NCO) band at 2265 cm (−1). The polymer solution was heated at 60 degrees C. for 2 hours. An IR spectrum then showed no OH band at 3550 cm (−1) but a small NCO band at 2265 cm (−1), confirming that all hydroxyls on the polymer had reacted with the IEM, thus placing one polymerizable group at the end of every chain. Methanol, 50 ml, was then added to the polymer solution and the solution was heated to 60 degrees C. for 2 hours. An IR spectrum showed no NCO band at 2265 cm (−1), a small OH band (from the methanol) at 3550cm (−1), and a carbon-carbon double bond (from the methacrylate functionality) at 1640 cm (−1).

If this stabilizer is reacted with acrylic monomer as in Example 1 and a coating composition prepared using the resulting stabilized resin as a rheology control agent, similar results will be obtained.

EXAMPLE 3

A macromonomer was prepared that had a NBMA composition with a methacrylate double bond at one end of the chain and an epoxy group at the other end. Using a procedure similar to that given in Example 2, a 1 liter flask was charged with 121.1 gm of toluene, 10.91 gm of 1-(2-trimethylsiloxyethoxy)-1-trimethylsiloxy-2-methyl propene, 0.040 m, and 0.44 ml of a 1.0 M solution of tetrabutylammonium m-chlorobenzoate dissolved in acetonitrile. Feed I, 178.5 gm of n-butyl methacrylate, was added over 31 minutes. Feed II, 0.41 ml of 1.0 M tetrabutylammonium m-chlorobenzoate and 4.32 gm of glyme, was begun simultaneously with Feed I. Feed II was added over 66 minutes. At 40 minutes into the run, the polymer solution was then cooled to 3 degrees C. Glycidyl methacrylate, 11.21 gm, was then added to the polymer solution in 1 shot. At 200 minutes, 10 gm of isopropanol was added to quench the reaction. The polymer formed had Mn=5780, Mw=7160, D=1.25, and Theo. Mn=4800. The polymer had 0.220 mmoles of epoxy per gm of solution (Theo.=0.234 mmoles/gm). To the polymer solution was added 2.53 gm of water and 19.96 gm of isopropanol. The polymer solution was refluxed for 4 hours then distilled until the vapor temperature reached 105 degrees C. A total of 62.6 gm of distillate was removed. An IR spectrum showed a band at 3550 cm (−1) present. To the polymer solution was added 1.29 gm of a 1% solution of dibutyltin dilaurate in methyl ethyl ketone and 12.13 gm of 2-isocyanoethyl methacrylate, 0.078 M. An IR spectrum then showed no OH band at 3550 cm (−1) but a smaller NCO band at 2265 cm (−1). Methanol, 50 ml, was then added to the polymer solution and the solution was heated to 60 degrees C. for 2 hours. An IR spectrum showed no NCO band at 2265 cm (−1) and a carbon-carbon double bond (from the methacrylate functionality) at 1640 cm (−1). The polymer had 0.20 mmoles of epoxy per gm of solution. The epoxy group can then undergo further reactions with materials that are commonly used in epoxy reactions. It can also be used as a crosslinking site in films and plastics.

The macromonomer can be reacted with acrylic resin as described in Example 1 to form a stabilized acrylic resin. If this stabilized acrylic resin is used in the preparation of a coating composition as described in Example 1, similar results will be obtained.

EXAMPLE 4

A NBMA macromonomer was prepared using a blocked acid initiator. The polymer was made by starting with a blocked acid initiator, polymerizing NBMA, deblocking the acid group, and reacting the acid terminated polymer with glycidyl methacrylate. This gave a NBMA macromonomer that has a methacrylate double bond at one end.

Using a procedure similar to that given in Example 2, a 1 liter flask was charged with 170.2 gm of toluene, 30.1 gm of propylene carbonate, 1.22 gm of xylene, 17.41 gm of 1-(bis-trimethylsiloxy)-2-methyl propene and 1.2 ml of a 1.0 M solution of tetraburylammonium m-chlorobenzoate dissolved in acetonitrile. Feed I, 294.9 gm of n-butyl methacrylate, was added over 60 minutes. Feed II, 1 ml of 1.0 M tetrabuylammonium m-chlorobenzoate and 4.46 gm of toluene, would begin simultaneously with Feed I. Feed II was added over 90 minutes. At 160 minutes, 6 gm of water and 180 gm of isopropanol was added to quench the reaction. The polymer $Mn=3500$, $Mw=4150$, $D=1.18$ and Theo. $Mn=4200$. It was 55.9 percent solids.

The polymer solution was refluxed for 1 hour. This gave a P-NBMA polymer that has one acid group at an end of the chain (Acid No. 7.25). Glycidyl methacrylate, 27.8 gm, and 0.36 gm of di-t-butyl catechol was added to the polymer solution. The solution was then heated for 4 hours. The Acid No. was reduced to less than 1.0, confirming that all acid groups had reacted with the epoxy, placing one polymerizable group at the end of every polymer chain. The final product is a 3500 Mn p-NBMA macromonomer that has one methacrylate double bond at the end of the chain.

We claim:
1. A stabilized acrylic resin having
   (a) a core of acrylic polymer which is non-soluble in organic solvent and, grafted thereto,
   (b) a plurality of substantially linear stabilizer components having an acrylic backbone, each of which is soluble in organic solvent and has one end of the stabilizer molecule grafted to the core,
   the stabilized acrylic resin being substantially free from non-polymerizable linear polymer.
2. A stabilized acrylic resin of claim 1 wherein the linear stabilizer components have a number average molecular weight of less than about 25,000.
3. A stabilized acrylic resin of claim 1 in which the stabilizer components are substantially uniform in size, and exhibit a dispersity of about from 1.0 to 2.5.
4. A stabilized acrylic resin of claim 1 wherein the stabilizer component further comprises non-terminal, non-polymerizable functional groups.
5. A stabilized acrylic resin of claim 4 wherein the non-terminal, non-polymerizable functional groups are selected from epoxy, amine, blocked hydroxyl, blocked acid and amide.
6. An acylic resin of claim 1 wherein the core is prepared from at least one monomer selected from the group consisting of methacrylic acid, hydroxy ethyl acrylate, methyl methacrylate, methyl acrylate, styrene and glycidyl methacrylate.
7. A coating composition comprising a film former, a liquid medium, and a stabilized acrylic resin of claim 1.
8. A coating composition of claim 7 further comprising pigment.
9. A process for the preparation of a stabilized acrylic resin comprising bringing into contact an unsaturated acrylic monomer with a catalyst system in the presence of an initiator containing silicon, tin or germanium and which has a first functional group as part of the structure to give a polymer chain having the first functional group at one end; and
   bringing the resulting polymer chain into contact, under reaction conditions, with a molecule having a second functional group which is reactive with the first functional group and which can be polymerized with other polymerizable monomers to provide a stabilizing component having an acrylic backbone, and bringing the resulting stabilizing component into contact, under reaction conditions, with unsaturated monomer to produce the stabilized acrylic resin.

* * * * *